(12) United States Patent
Bleicher et al.

(10) Patent No.: US 7,797,794 B2
(45) Date of Patent: Sep. 21, 2010

(54) SUCTION DEVICE FOR PICK POWER TOOL

(75) Inventors: Jochen Bleicher, Penzing (DE); Oliver Ohlendorf, Landsberg (DE); Georg Holzmeier, Untermeitingen (DE)

(73) Assignee: Hilti Aktiengesellschaft, Schaan (LI)

( * ) Notice: Subject to any disclaimer, the term of this patent is extended or adjusted under 35 U.S.C. 154(b) by 475 days.

(21) Appl. No.: 11/800,484

(22) Filed: May 4, 2007

(65) Prior Publication Data

US 2007/0261195 A1    Nov. 15, 2007

(30) Foreign Application Priority Data

May 8, 2006    (DE) ..................... 10 2006 000 214

(51) Int. Cl.
*A47L 9/02* (2006.01)
(52) U.S. Cl. ........................ 15/415.1; 15/344
(58) Field of Classification Search ............... 15/344, 15/339, 415.1; 144/251.1; 408/67, 58; 451/456
See application file for complete search history.

(56) References Cited

U.S. PATENT DOCUMENTS 5,160,230 A * 11/1992 Cuevas ...................... 408/67
5,983,445 A * 11/1999 Baker ........................ 15/339
6,079,078 A *  6/2000 Byington ..................... 15/339
6,854,937 B1 *  2/2005 Weiss ....................... 409/137
7,347,651 B2 *  3/2008 Hintze et al. ................ 408/67

FOREIGN PATENT DOCUMENTS

| GB | 1334366 | 10/1973 |
| WO | 9520440 | 8/1995 |

* cited by examiner

*Primary Examiner*—Dung Van Nguyen
(74) *Attorney, Agent, or Firm*—Abelman, Frayne & Schwab

(57) ABSTRACT

A suction device for a pick power tool includes a securing device provided at the first axial end of the suction device for securing the suction device (11) on the pick power tool (6), a connection element (17) for a vacuum source inclined to the longitudinal axis (14) of the suction device (11), and a first baffle wall (21) and at least one further baffle wall (26) spaced from the first baffle wall (21), with the first baffle wall being located between the connection element (17) and the first end (12) of the suction device (11) and the at least one further baffle wall (21) being located between the first baffle wall and the first end (12), and the first baffle wall (21) and the second baffle wall (26) each having, respectively, a through-opening (22, 27) for the working tool (7) of the pick power tool (6).

10 Claims, 2 Drawing Sheets

SUCTION DEVICE FOR PICK POWER TOOL

BACKGROUND OF THE INVENTION

1. Field of the Invention

The present invention relates to a suction device for a pick power tool and which extends along a longitudinal axis and having opposite first and second ends, with the suction device including a receiving chamber for regionwise surrounding of a working tool of the pick power tool, a securing device provided at the first end of the suction device for securing the suction device on the pick power tool, and a connection element for a vacuum source extending at an angle to the longitudinal axis of the suction device.

2. Description of the Prior Art

When treating a mineral constructional component, e.g., a concrete wall or a concrete ceiling with a working tool of a pick power tool such as hammer drill, combi- or chisel hammer, pieces of the removable material and dust are produced. In particular, dust particles cause contamination of the environment, e.g., interior spaces of a building, and adversely affect operation of the power tool.

International Application WO 95/20440 A1 discloses a suction device for an electrical hand-held drilling tool and which extends along a longitudinal axis and has opposite first and second ends. The suction device has a receiving chamber for regionwise surrounding of a working tool of the drilling power tool. A device is provided at the first end of the suction device for securing the suction device on the power tool. The suction device has an elastic section the longitudinal extension of which is reduceable in the direction parallel to the longitudinal axis of the suction device, and the free end of which forms a second end of the suction device. The suction device has a connection union that forms a connection element for a suction conduit of a vacuum source, with the connection union extending at an angle to the longitudinal axis of the suction device.

For working a constructional component, the second end of the suction device is brought into contact with the constructional component so that during a drilling operation, the produced dust and pieces of the removable material are aspirated by the vacuum source, e.g., in form of an industrial vacuum cleaner. The elastic section insures a reliable abutment of the suction device with the constructional component even as the material removal process advances when the working tool penetrates into the constructional component, and even when the pick power tool extends transverse to the constructional component. When the connection element extends at an angle to the longitudinal axis of the suction device, a suction flow for an advantageous aspiration of the dust particles is produced in the suction device.

The drawback of the known solution consist in that many dust particles of different sizes can reach the tool holder of the power tool and cause an increased wear of the tool holder. Because of entrainment of the dust in the tool holder, an increase wear of the working tool shank as well as in the percussion mechanism of the pick power tool can occur.

British publication GB 1 334 366 discloses a suction device for an electrical hand-held drilling tool and which has an intermediate wall with a receiving chamber for the tool holder of the power tool and a through-opening for a working tool receivable in the tool holder.

The drawback of the device of GB 1 334 366 consists in that undesirable turbulences can be generated in the suction device, and therefore, the dust particle can penetrate up to the tool holder. The particles can accumulate in the gap between the intermediate wall and the tool holder and cause therein, in particular when the chuck is rotated, an increased wear.

Accordingly, an object of the present invention is to provide a suction device for a pick power tool and that would ensure a reduced dust loading of the pick power tool itself.

Another object of the present invention is to provide a suction device for a pick power tool and which would provide for a reduced wear of the components of the power tool.

SUMMARY OF THE INVENTION

These and other objects of the present invention, which will become apparent hereinafter, are achieved by providing a suction device of the type described above and having a first baffle wall and at least one further baffle wall spaced from the first baffle wall. The first baffle wall is located between the connection element and the first end of the suction device, and the at least one further baffle wall is located between the first baffle wall and the first end. The first baffle wall and the second baffle wall each has, respectively, a through-opening for the working tool of the pick power tool.

The arrangement of at least two, spaced from each other, baffle walls above an air stream aspirated by a vacuum source, insures a satisfactory aspiration of the produced dust particles and prevents entrapment of the dust particles up to the pick power tool. The second baffle wall can be formed, e.g., as an insertion part securable in the receiving chamber of the suction device, e.g., by a holding device or with glue means. The through-openings in the baffle walls are adapted advantageously for conventional working tools used with the pick power tool. This permits to reduce the clearance between the through-openings and the working tools. Dust particles that penetrate through the clearance in the first baffle wall, are substantially caught in the intermediate space between the first baffle wall and the at least one further baffle wall. If further baffle walls are provided in the suction device, the dust particles that has penetrated through the clearance in the at least one further baffle wall, are caught in the intermediate space between this baffle wall and the further baffle wall. Should few separate dust particles still reach the tool holder of the power tool, their number and size would be small enough to cause any noticeable wear of the power tool and, in particular, of the tool holder.

Generally, at least two baffle walls are used, however, dependent on the final design of the suction device, that number can be increased. Preferably, from two to ten and, advantageously, from two to four baffle walls are provided in a suction device.

Advantageously, the suction device has an elastic section, which insures a reliable abutment of the suction device with the constructional component even at an advanced operation and even when the power tool extends at an angle toward the constructional component.

The securing device is formed, advantageously, for releasably securing the suction device on the power tool and has, to this end, e.g., a clamp element that provides for securing the suction device on the housing of the power tool or on the tool holder. With a rotatable toll holder, the suction device can be secured on the tool holder with a slide or roller bearing.

Advantageously, at least the first baffle wall is inclined with respect to the longitudinal axis of the suction device, whereby a suction flow, which is produced by the vacuum source, is diverted and the entrained, by the suction flow, dust particles are removed. Advantageously, the first baffle wall is arranged with respect to the longitudinal axis of the suction tool at an angle from 20° to 70°. The at least one further baffle wall can also be arranged so that it is also inclined to the longitudinal axis of the suction device, e.g., at the same angle as the first baffle wall, be arranged parallel to the first baffle wall, or can be oriented in opposite direction.

Advantageously, at least the first baffle wall is arranged parallel to the connection device for the vacuum source, whereby the suction flow, which is produced by the vacuum source, can be diverted particularly advantageously.

Advantageously, at least the first baffle wall is curved, and a concave cavity, which is formed by the first baffle wall, is located adjacent to the second end of the suction device. With a curved baffle wall, the suction device has a smaller number of edges. Thereby, the number of undesired points of turbulence in the interior of the suction device is reduced, so that the efficiency of the suction flow, which is produced by the vacuum source, increases.

Advantageously, one of the two main curvature axes of the curve baffle wall is constant or is mathematically expressed by zero, i.e., it corresponds to a straight line. The two main curvature axes are represented by two main curvature axes mutually perpendicular to each and which define the curvature of the curved baffle wall. The curved baffle wall has essentially a shape of a hollow cylindrical section the outer rim of which is airtightly connected with the wall of the suction device.

Advantageously, the main curvature axis, which is mathematically expressed by zero, extends parallel to an orientation of the connection device, which additionally reduces the number of points of undesirable turbulence in the interior of the suction device.

Advantageously, the suction device has at least one suction opening. The suction opening is provided between the first baffle wall and the first end of the suction device. Through this opening, environmental air for rinsing the region between the first baffle wall and the first end is aspirated. Thereby, a so-called airing process is initiated which prevents to a most possible extent dust entrapment in the direction of the pick power tool through the annular gap between the first baffle wall and the working tool of the pick power tool. Advantageously, there are provided several suction openings with a smaller cross-section, so that only an insignificant portion of pollutants, which is contained in the environment, is aspirated in the region between the first baffle wall and the first end of the suction device.

Advantageously, the at least one suction opening is located between at least one further baffle wall and the first end, whereby, in particular in the region in front of the tool holder of the power tool, a satisfactory air rinsing takes place during operation of a vacuum pump, so that penetration of dust particles up to the tool holder is prevented to a most possible extent.

Advantageously, the at least one suction opening is formed as a bore, preferably, in the wall of the suction device. It is particularly advantageous when a plurality of bores is formed in a plane extending transverse to the longitudinal axis of the suction device, preferably, equidistantly from each other. In order to insure an improved air rinsing of the region between the first baffle wall and the first end of the suction device, the suction device is sealingly mounted on the power tool, which improves the suction effect through the suction opening or openings.

Advantageously, the at least one suction opening is formed as a channel extending parallel to the longitudinal axis of the suction device and located in a region of the first end of the suction device. E.g., the suction device can be so arranged that it is spaced, at least regionwise, from a housing section of the power tool in the region of the first end in order to provide the at least one suction channel.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

BRIEF DESCRIPTION OF THE DRAWINGS

The drawings show.

DETAILED DESCRIPTION OF THE PREFERRED EMBODIMENT

Figure 1:
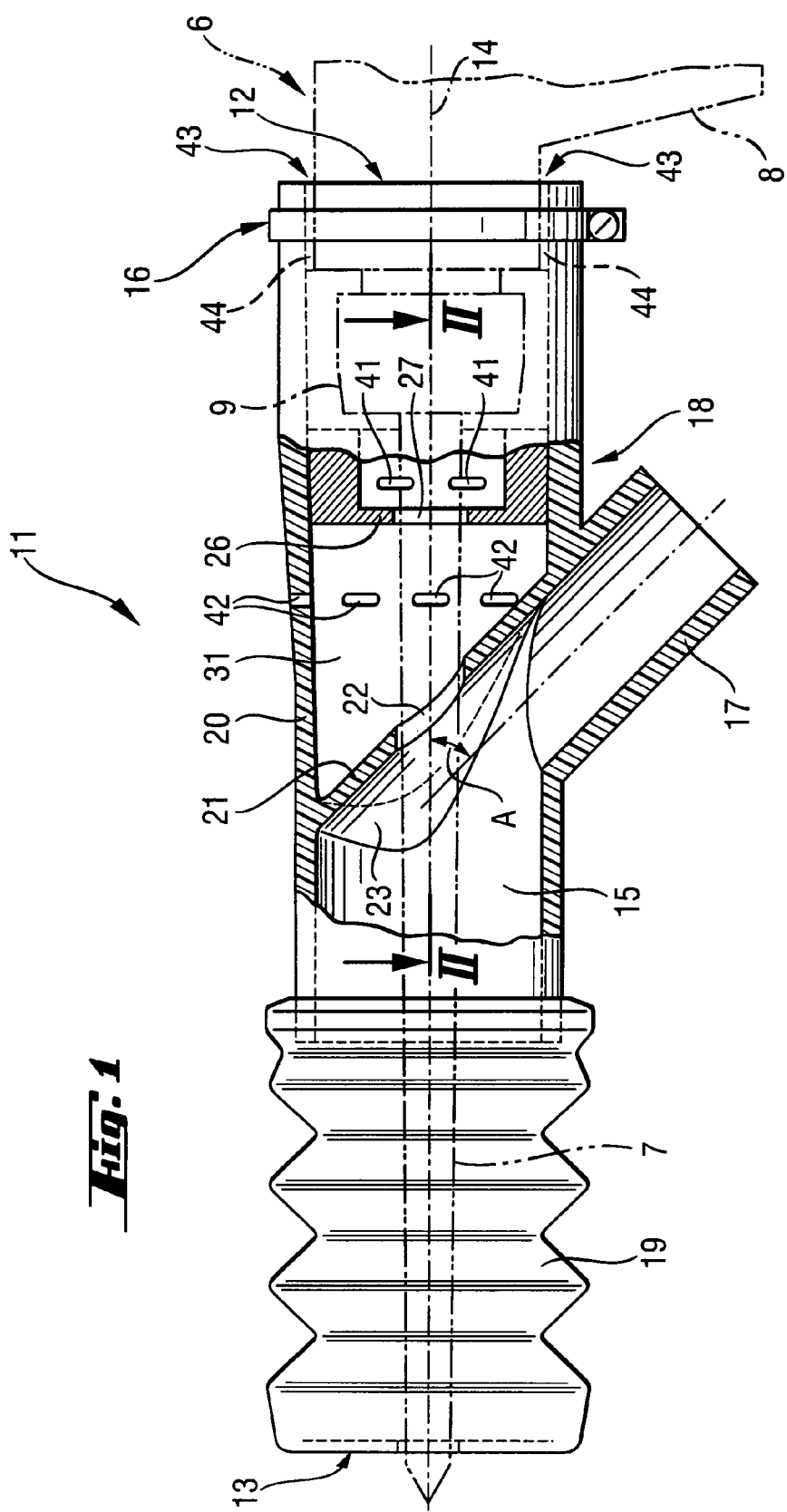
FIG. 1 a partially cross-sectional side view of the suction device according to the present invention.
Figure 2:
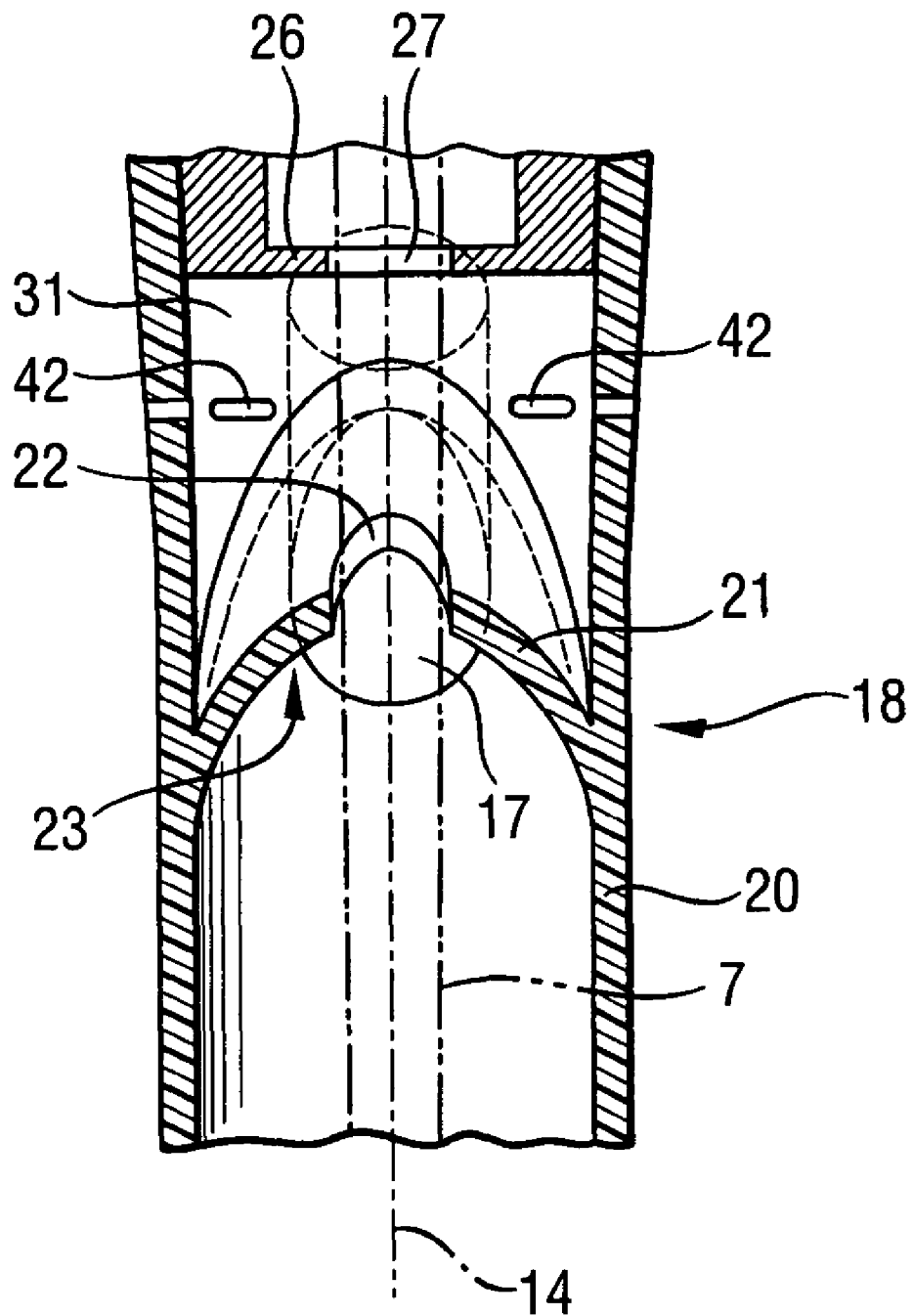
FIG. 2 a cross-sectional view along line II-II in FIG. 1 of a section of the suction device shown in FIG. 1.

A suction device 11 according to the present invention for a pick power tool 6 such as a hammer drill and which is shown in FIGS. 1-2, has a first end 12 and an opposite second end 13. The suction device 11 extends along a longitudinal axis 14 and has a receiving chamber 15 that regionwise surrounds a working tool 7 of the pick power tool 6. The receiving chamber 15 is formed by a rigid, tubular section 18 and an elastic section 19. The rigid section 18 extends from the first end 12 of the suction device 12 in a direction of the second end 13 of the suction device 11. The elastic section 19 adjoins the rigid section 18 in the direction of the second end 13 and extends up to the second end 13, with a free end of the elastic section 19 forming the second end 13 of the suction device 11.

On the first end 12 of the suction device 11, there is provided a securing device 16 for securing the suction device 11 on the pick power tool 6. The securing device 16 is formed, in the embodiment shown in the drawings, as a collar clamp. The suction device 11 further has a connection element 17 in form of a connection union for a vacuum source. The connection union extends at an angle A of 45° to the longitudinal axis 14 of the suction device 11.

In the suction device 11, there are further provided spaced from each other, first and second baffle walls 21 and 26. The first baffle wall 21 is located between the connection element 17 and the first end 12, and the second baffle walls 26 is located between the first baffle wall 21 and the first end 12 of the suction device 11. The first and second baffle walls 21 and 26 have, respectively, a through-opening 22 and 27 for a working tool 7 of the pick power tool 6. A section of the suction device 11 between the second baffle wall 26 and the first end 12 surrounds a tool holder 9 of the pick power tool 6.

The first baffle wall 26 is inclined with respect to the longitudinal axis 14 and extends parallel to the orientation of the connection element 17. In addition, the first baffle wall 21 is curved, with a concave cavity 23, which is formed by the first baffle wall 21, being adjacent to the second end 13 of the suction device 11. Exactly one of the two main curvature axes of the curved first baffle wall 21 is constant, e.g., identical mathematical zero and extends parallel to the orientation of the connection element 17. In the embodiment shown in the drawings, the first baffle wall 21 is formed by a wall section of a hollow cylinder and is connected with the wall 20 of the suction device 11.

A plurality of suction openings 41 are provided between the second baffle wall 26 and the first end 12 of the suction device 11. The suction openings 41 are formed as radial bores in the wall 20 of the rigid section 18 of the suction device 11.

Additionally or alternatively, suction openings 42, which are likewise formed as radial bores, are provided in the wall 20 of the suction device 11 between the first baffle wall 21 and the second baffle wall 26.

In the region of its first end 12, the suction device 11 is spaced, regionwise, from a housing 8 of the pick power tool 6 to form channels 44 extending parallel to the longitudinal axis 14, whereby further suction openings 43 are formed.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A suction device for a pick power tool (6) extending along a longitudinal axis (14) and having opposite first (12) and second (13) ends, the suction device comprising:
    a receiving chamber (15) for a regionwise surrounding of a working tool (7) of the pick power tool (6);
    a securing device (16) provided at the first end of the suction device for securing the suction device (11) on the pick power tool (6);
    a connection element (17) for a vacuum source extending at an angle (A) to the longitudinal axis (14) of the suction device (11); and
    a first baffle wall (21) located in the receiving chamber (15), and at least one further baffle wall (26) and likewise located in the receiving chamber (15) and spaced from the first baffle wall (21), the first baffle wall being located between the connection element (17) and the first end (12) of the suction device (11) and the at least one further baffle wall (26) being located between the first baffle wall and the first end (12), and the first baffle wall (21) and the second baffle wall (26) each having, respectively, a through-opening (22, 27) for the working tool (7) of the pick power tool (6).

2. A suction device according to claim 1, wherein at least the first baffle wall (21) is inclined to the longitudinal axis (14) of the suction device (11).

3. A suction device according to claim 2, wherein at least the first baffle wall (21) extends parallel to an orientation of the connection element (17).

4. A suction device according to claim 1, wherein at least the first baffle wall (21) is curved, and a concave cavity (23), which is formed by the first baffle plate (21), is located adjacent to the second end (13) of the suction device (11).

5. A suction device according to claim 4, wherein one of two main curvature axes of the curved first baffle wall (21) is mathematically expressed by zero.

6. A suction device according to claim 5, wherein the one of two main curvature axes extends parallel to an orientation of the connection element (17).

7. A suction device for a pick power tool (6) extending along a longitudinal axis (14) and having opposite first (12) and second (13) ends, the suction device comprising:
    a receiving chamber (15) for a regionwise surrounding of a working tool (7) of the pick power tool (6);
    a securing device (16) provided at the first end of the suction device for securing the suction device (11) on the pick power tool (6);
    a connection element (17) for a vacuum source extending at an angle (A) to the longitudinal axis (14) of the suction device (11);
    a first baffle wall (21) located in the receiving chamber (15), and at least one further baffle wall (26) and likewise located in the receiving chamber (15) and spaced from the first baffle wall (21), the first baffle wall being located between the connection element (17) and the first end (12) of the suction device (11) and the at least one further baffle wall (26) being located between the first baffle wall and the first end (12), and the first baffle wall (21) and the second baffle wall (26) each having, respectively, a through-opening (22, 27) for the working tool (7) of the pick power tool (6); and at least one suction opening (41, 42, 43) between the first baffle wall (21) and the first end (12) of the suction device (11).

8. A suction device according to claim 7, wherein the at least one suction opening (41, 43) is provided between the at least one further baffle wall (26) and the first end (12) of the suction device (11).

9. A suction device according to claim 7, wherein the at least suction opening (41, 42) is formed as a bore.

10. A suction device according to claim 7, wherein the at least one suction opening (43) is formed as channel (44) extending parallel to the longitudinal axis (14) of the suction device (11) and located in a region of the first end (12) of the suction device.

* * * * *